United States Patent
Uchikawa

(10) Patent No.: US 10,863,425 B2
(45) Date of Patent: Dec. 8, 2020

(54) INFORMATION PROCESSING APPARATUS, METHOD OF CONTROLLING THE SAME, AND PROGRAM

(71) Applicant: CANON KABUSHIKI KAISHA, Tokyo (JP)

(72) Inventor: Shinichi Uchikawa, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 16/310,880

(22) PCT Filed: Jul. 21, 2017

(86) PCT No.: PCT/JP2017/026437
§ 371 (c)(1),
(2) Date: Dec. 18, 2018

(87) PCT Pub. No.: WO2018/037792
PCT Pub. Date: Mar. 1, 2018

(65) Prior Publication Data
US 2020/0100171 A1    Mar. 26, 2020

(30) Foreign Application Priority Data
Aug. 24, 2016 (JP) ................ 2016-164064

(51) Int. Cl.
*H04W 48/16* (2009.01)
*H04W 76/14* (2018.01)
(Continued)

(52) U.S. Cl.
CPC .......... *H04W 48/16* (2013.01); *H04W 8/005* (2013.01); *H04W 12/06* (2013.01); *H04W 76/14* (2018.02);
(Continued)

(58) Field of Classification Search
CPC ..... H04W 48/16; H04W 88/06; H04W 12/06; H04W 84/12; H04W 76/14; H04N 1/00416
See application file for complete search history.

(56) References Cited

U.S. PATENT DOCUMENTS

2005/0279833 A1    12/2005 Tanaka
2015/0023334 A1*    1/2015 Suga .................. H04W 48/16
                                                   370/338
(Continued)

FOREIGN PATENT DOCUMENTS

EP        2590467 A2    5/2013
JP     2006311137 A    11/2006
(Continued)

OTHER PUBLICATIONS

International Search Report issued in Intl. Appln. No. PCT/JP2017/026437 dated Oct. 27, 2017.
(Continued)

*Primary Examiner* — Habte Mered
(74) *Attorney, Agent, or Firm* — Rossi, Kimms & McDowell LLP

(57) ABSTRACT

A technique by which a user such as an administrator can appropriately manage activation and stoppage of services that enables performance from an external apparatus of setting for connecting an information processing apparatus to a particular network is provided. A printer (information processing apparatus) activates a wireless LAN setting service in a state in which a wireless network I/F is caused to operate in an access point mode. The printer, via the wireless network I/F, receives network setting information transmitted from the mobile terminal for setting using the wireless LAN setting service. When the network setting information is received, the printer stops the wireless LAN setting service.

9 Claims, 11 Drawing Sheets

(51) Int. Cl.
*H04W 8/00* (2009.01)
*H04W 12/06* (2009.01)
*H04W 84/12* (2009.01)
*H04W 88/06* (2009.01)
*H04N 1/00* (2006.01)

(52) U.S. Cl.
CPC .......... *H04W 84/12* (2013.01); *H04W 88/06* (2013.01); *H04N 1/00416* (2013.01)

(56) References Cited

U.S. PATENT DOCUMENTS

| 2015/0156063 | A1* | 6/2015 | Maetz | H04L 12/2838 370/254 |
|---|---|---|---|---|
| 2015/0281494 | A1* | 10/2015 | Adachi | H04N 1/32545 358/474 |
| 2016/0224290 | A1* | 8/2016 | Suzuki | G06F 3/1203 |
| 2017/0359129 | A1* | 12/2017 | Saito | H04B 17/318 |
| 2018/0225069 | A1* | 8/2018 | Hosoda | G06F 3/1236 |

FOREIGN PATENT DOCUMENTS

| JP | 2010098765 A | 4/2010 |
|---|---|---|
| JP | 2013153533 A | 8/2013 |
| JP | 2014241487 A | 12/2014 |

OTHER PUBLICATIONS

Written Opinion issued in Intl. Appln. No. PCT/JP2017/026437 dated Oct. 27, 2017.
Office Action issued in Japanese Appln. No. 2016-164064 dated Sep. 25, 2020.
English machine translation of Office Action issued in Japanese Appln. No. 2016-164064 dated Sep. 25, 2020, previously cited in IDS filed Oct. 8, 2020.

\* cited by examiner

[Fig. 1]
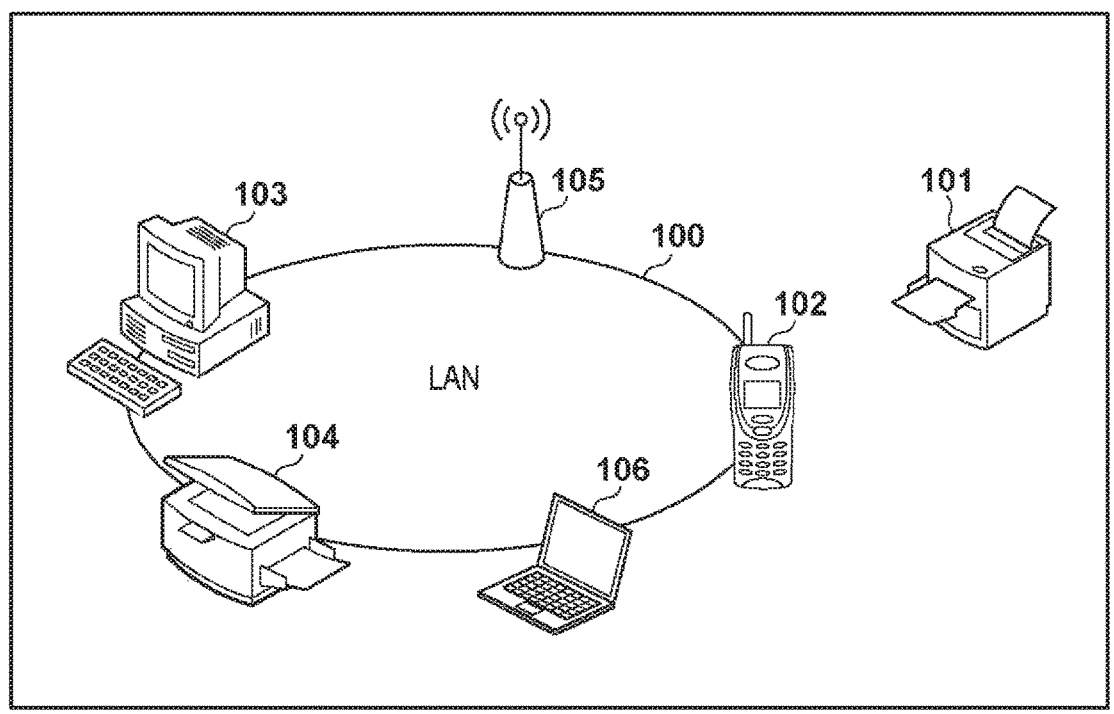

[Fig. 2]
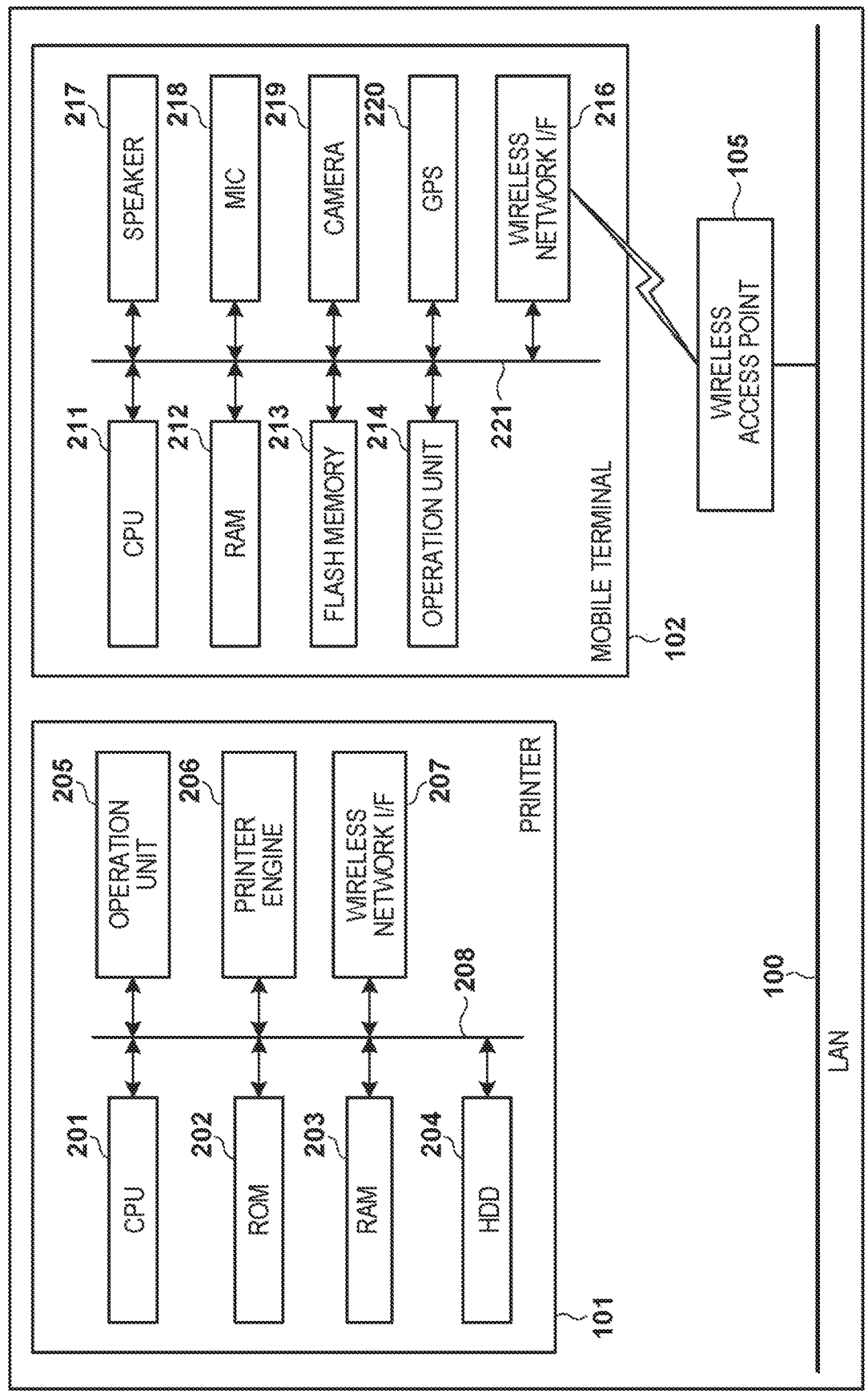

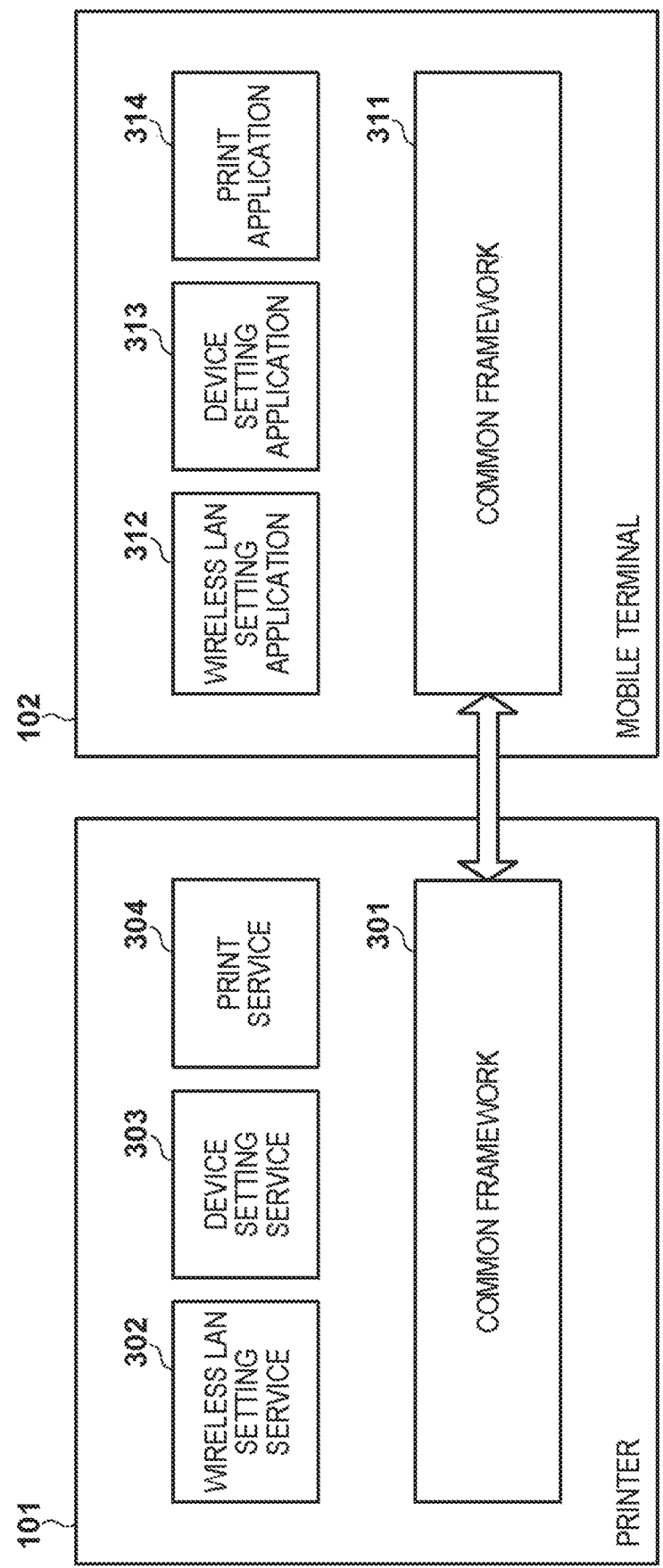

[Fig. 4A]
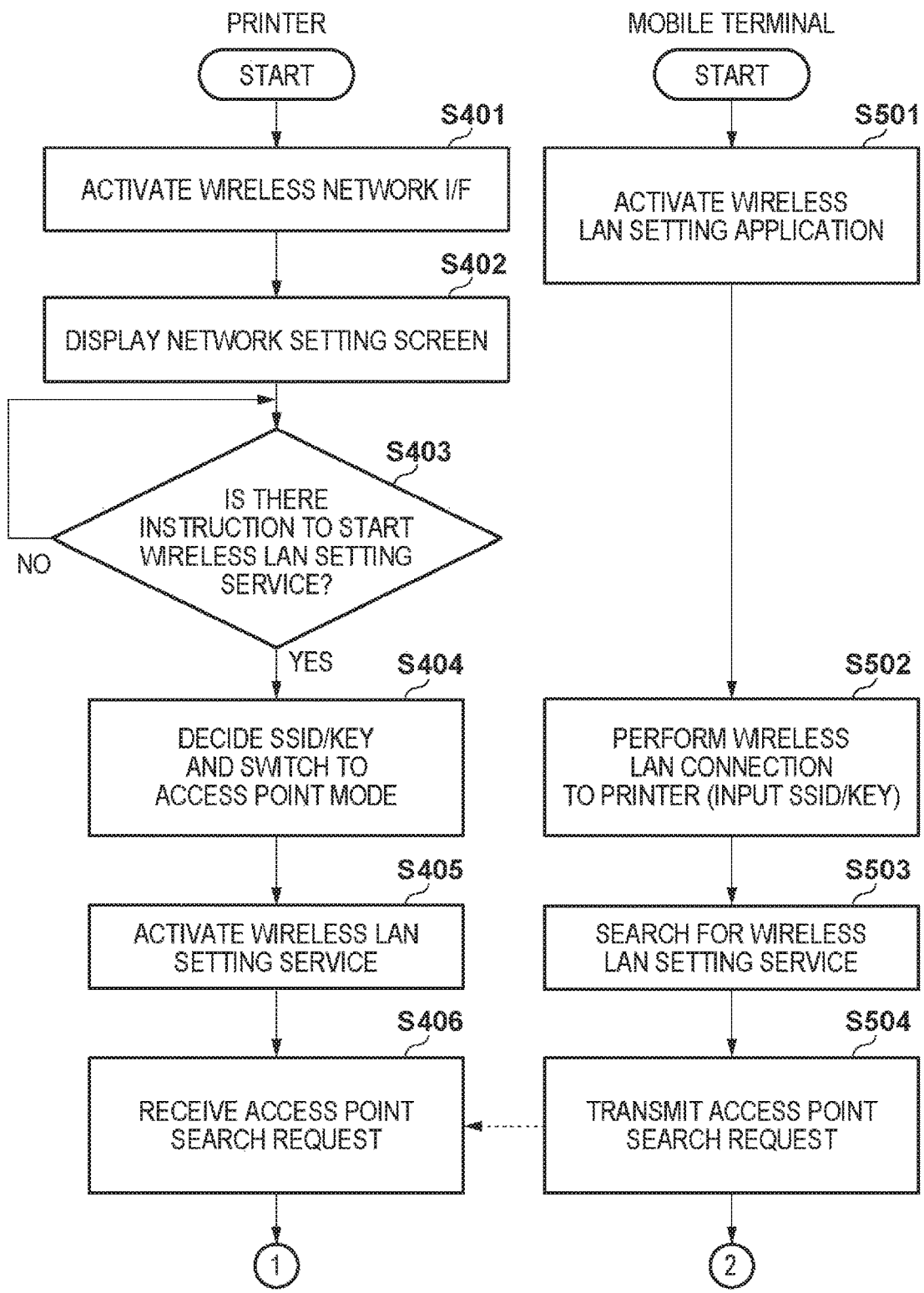

[Fig. 4B]
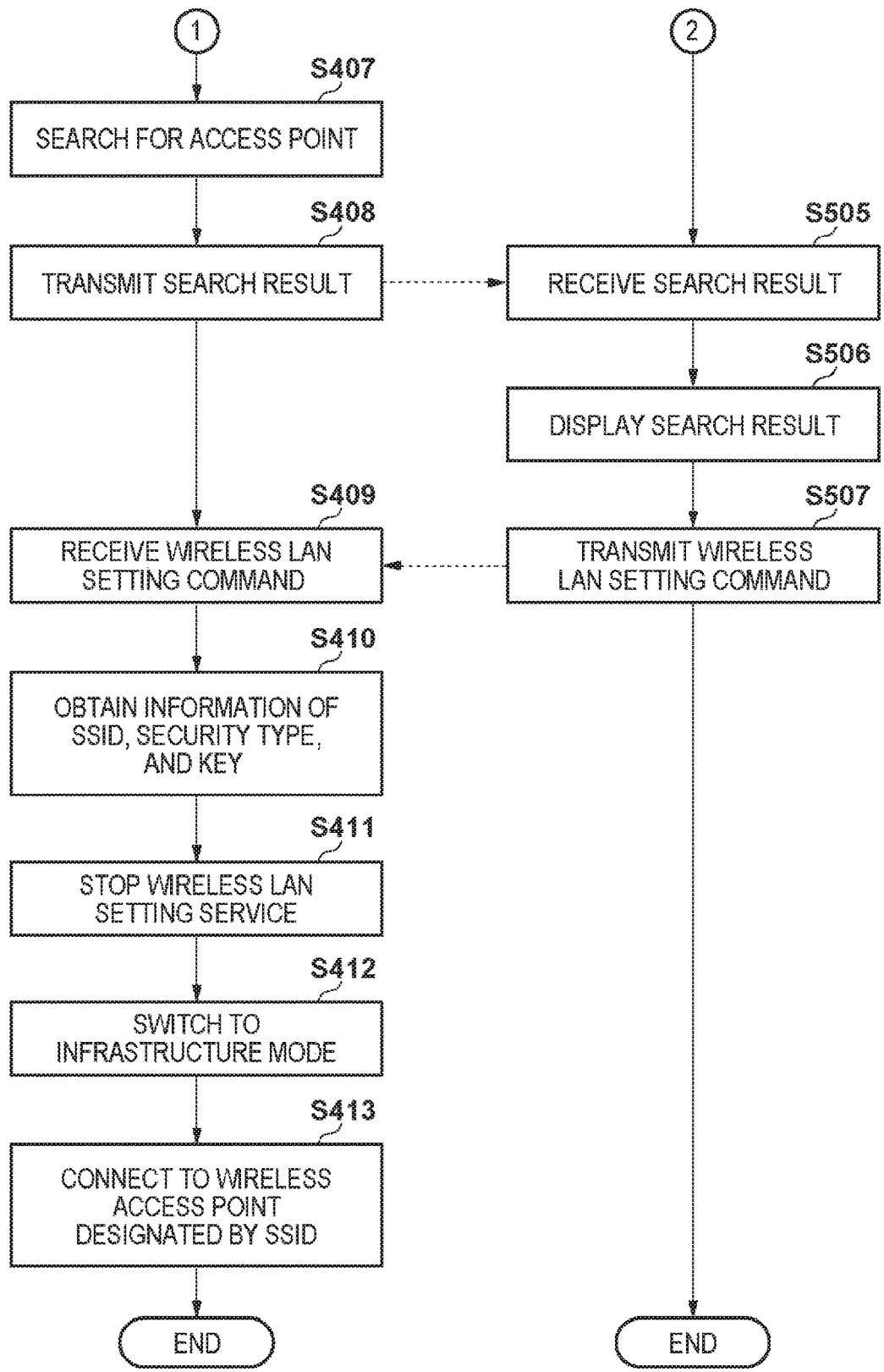

[Fig. 5A]
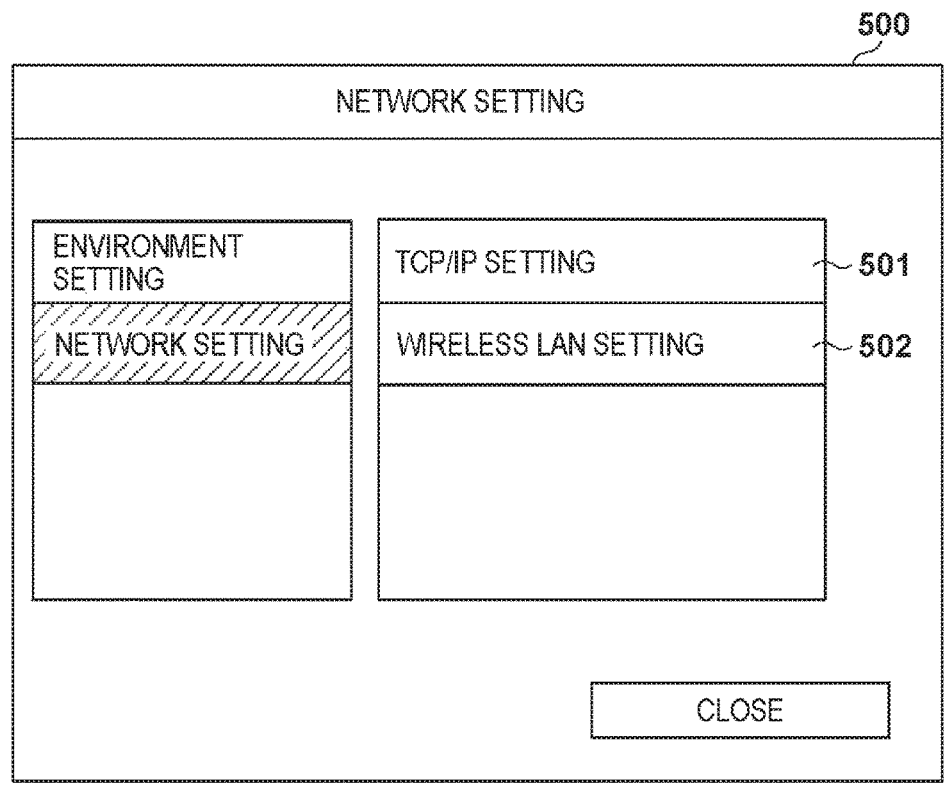
[Fig. 5B]
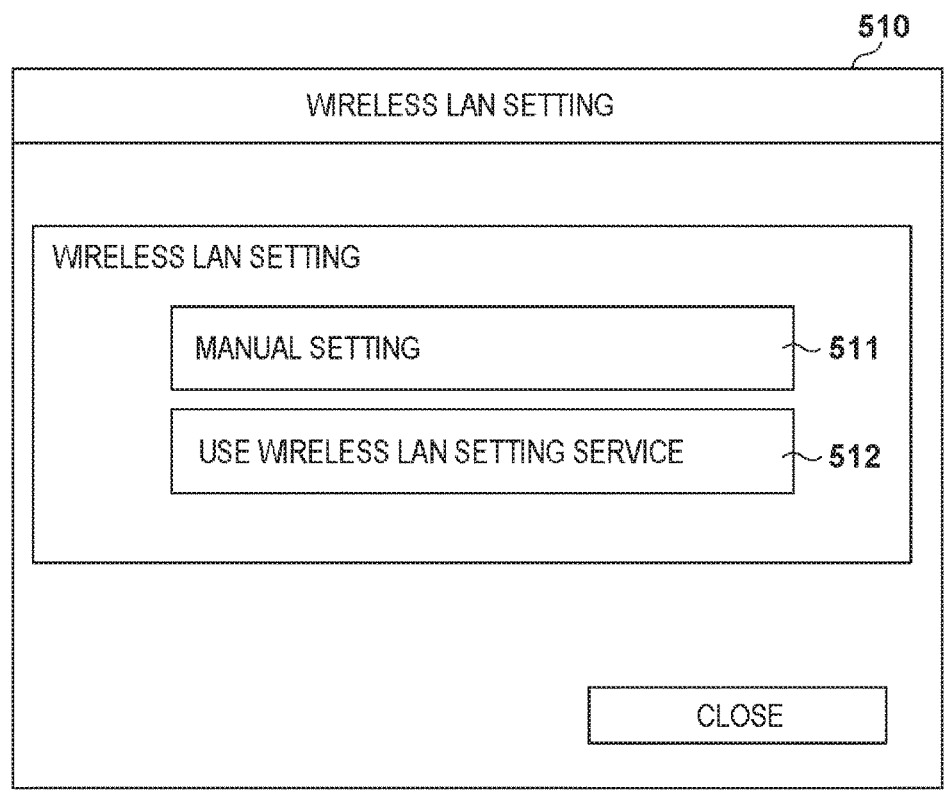

[Fig. 5C]
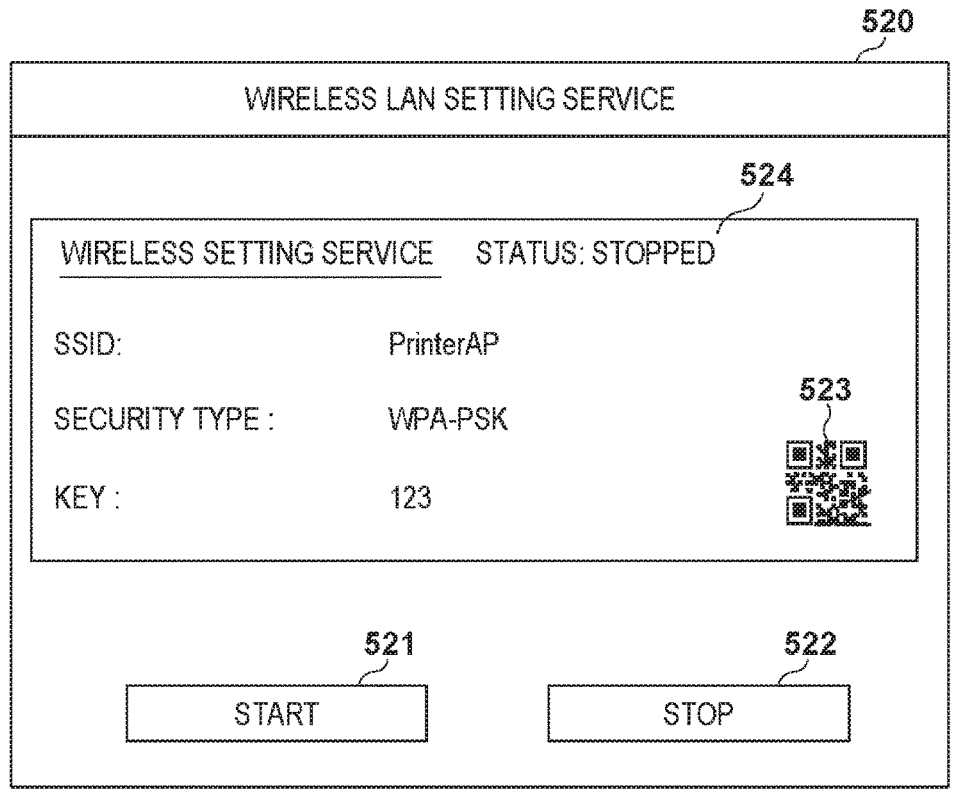
[Fig. 5D]
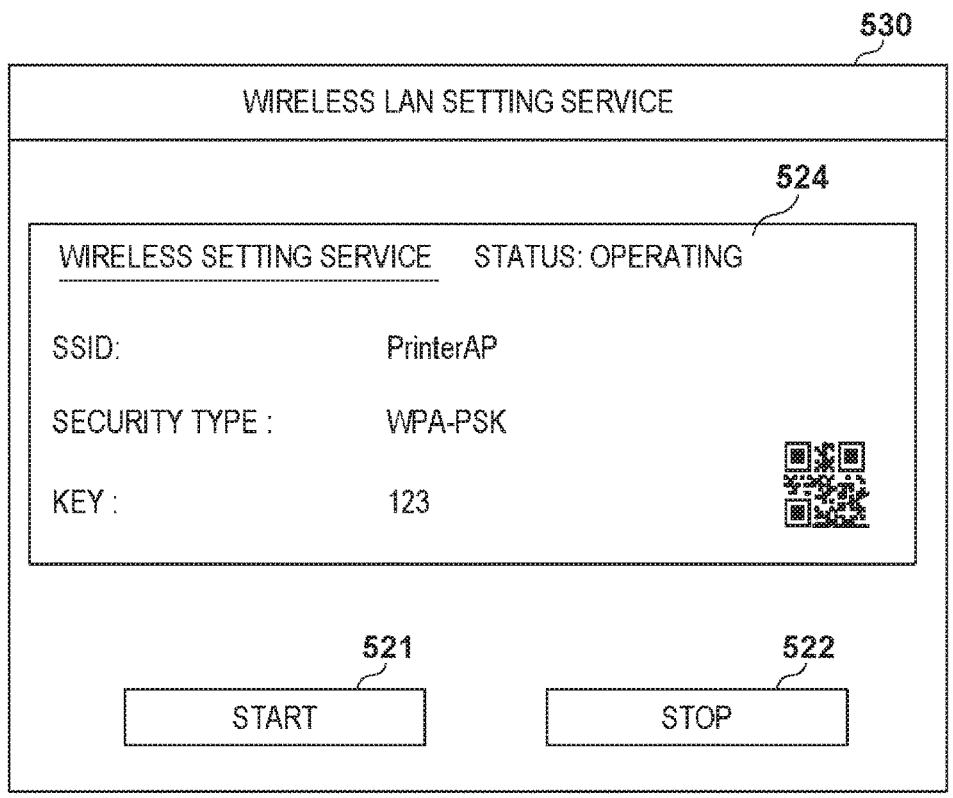

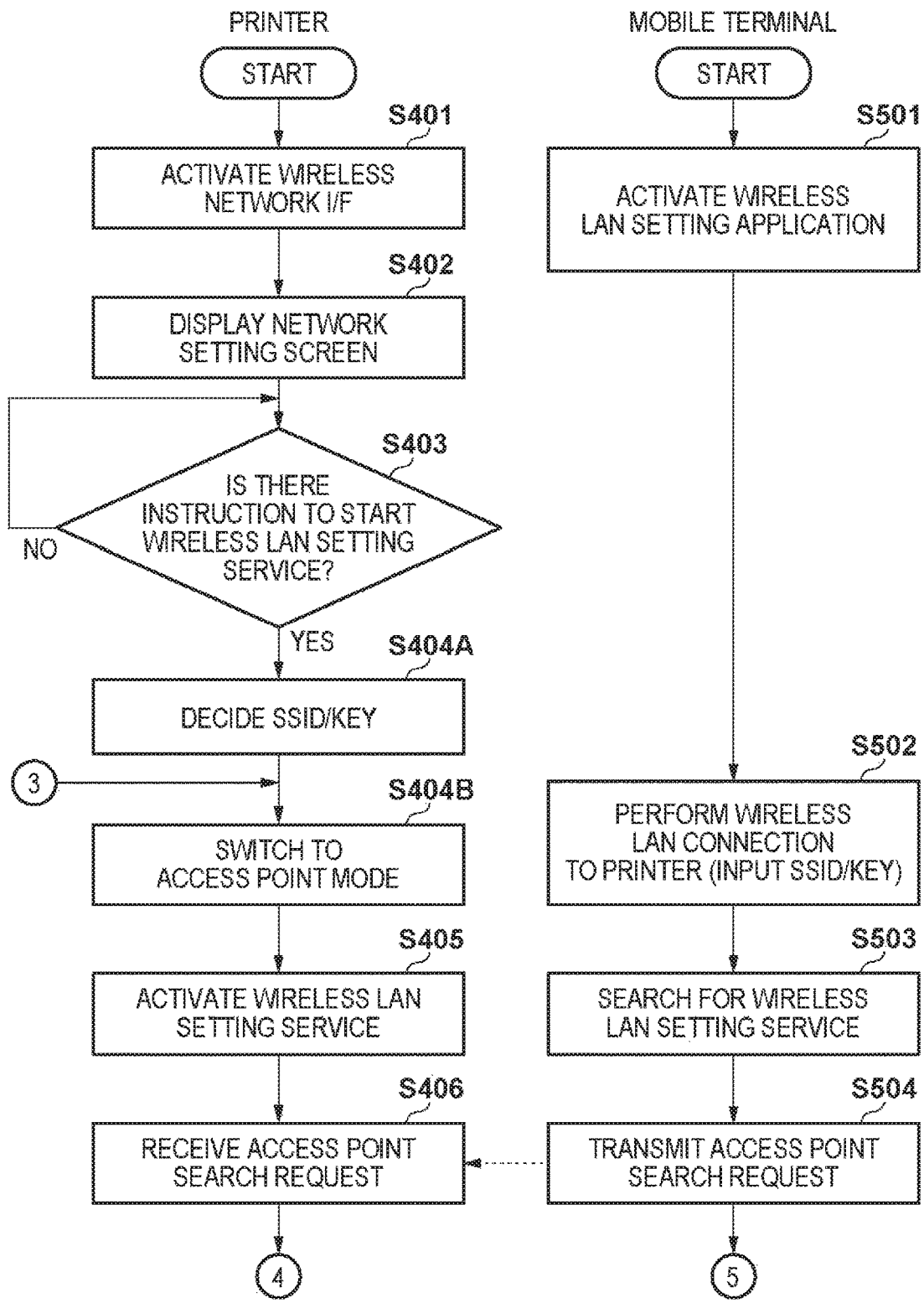
[Fig. 6A]

[Fig. 6B]
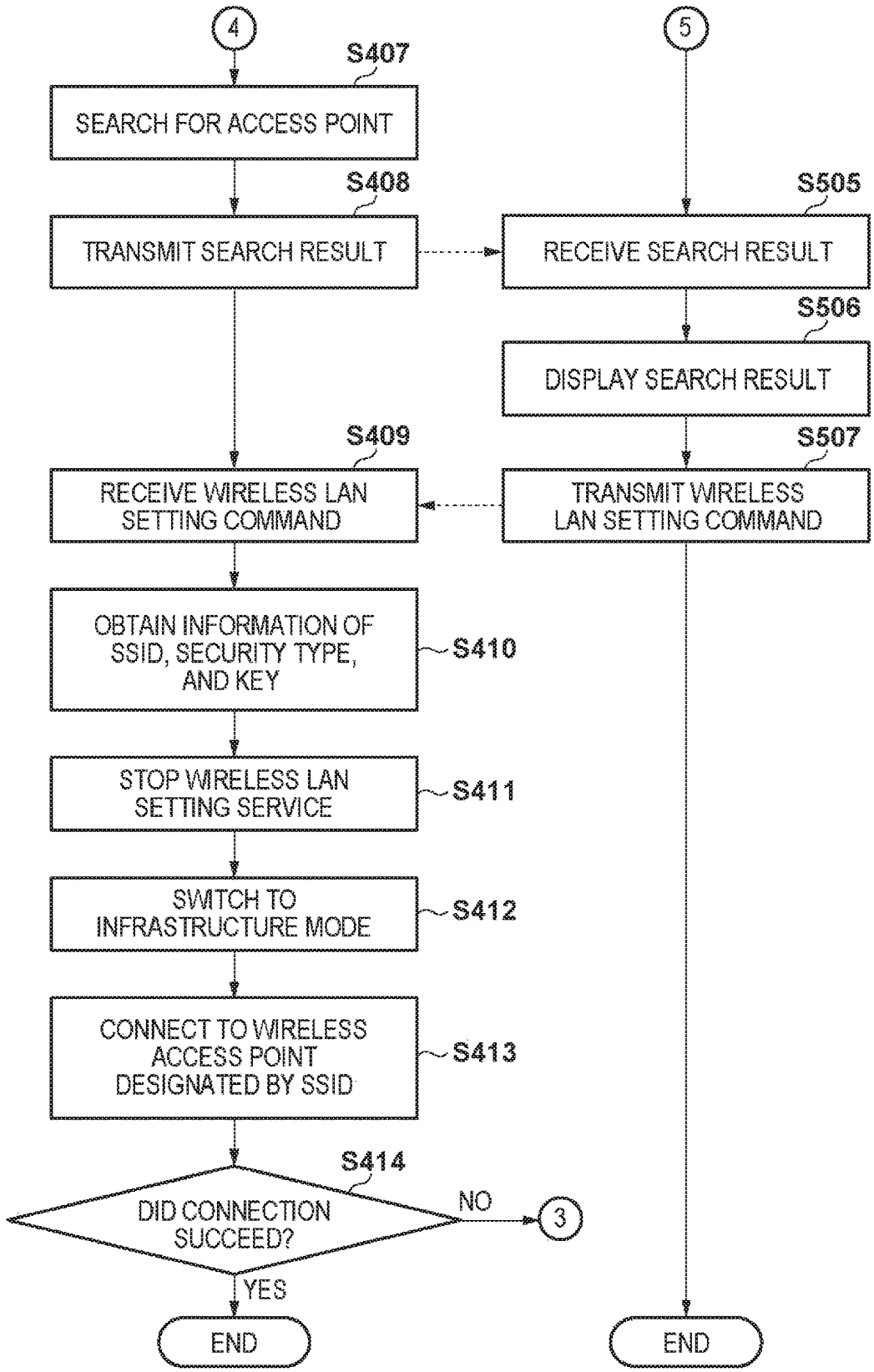

[Fig. 7A]
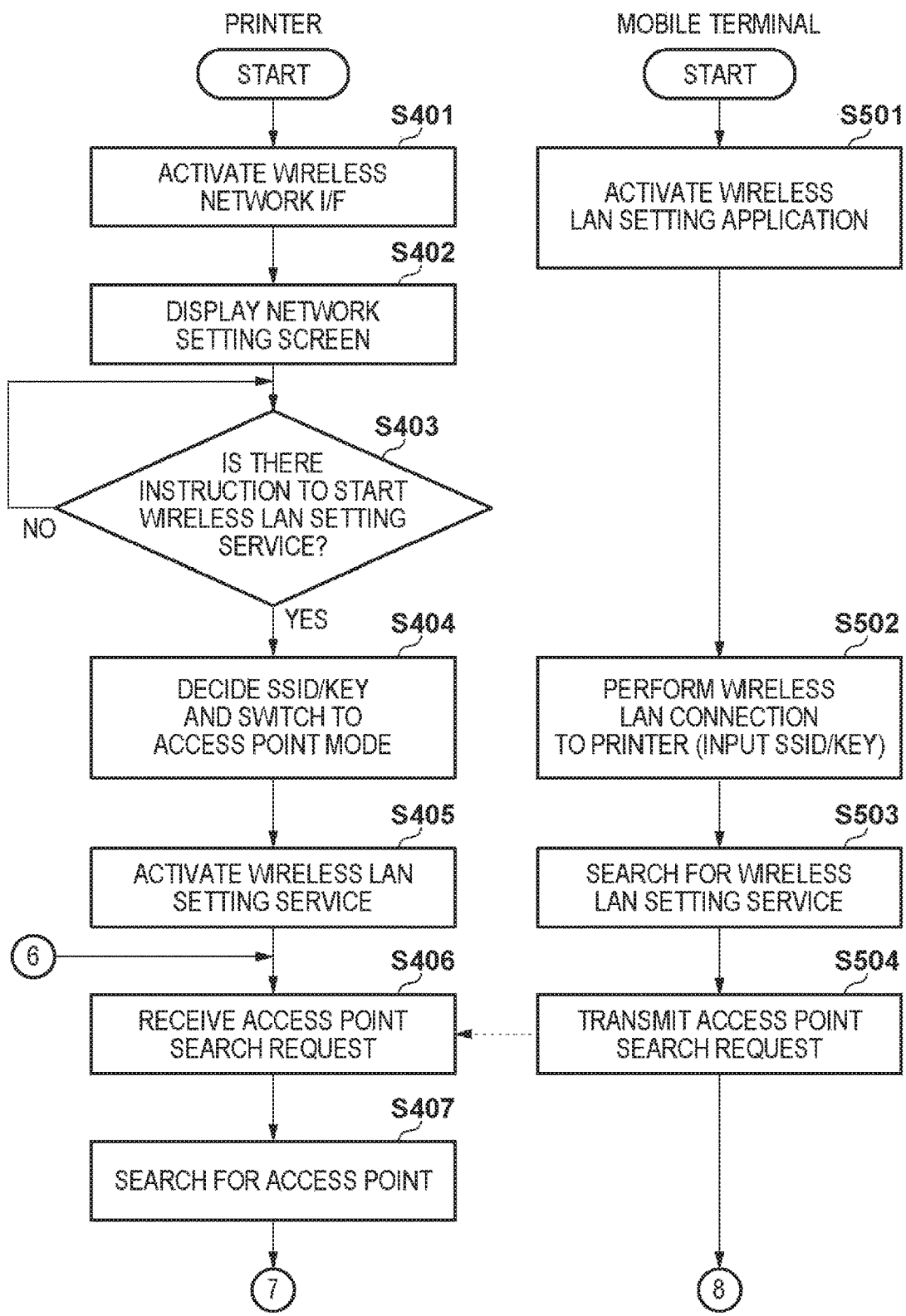

[Fig. 7B]
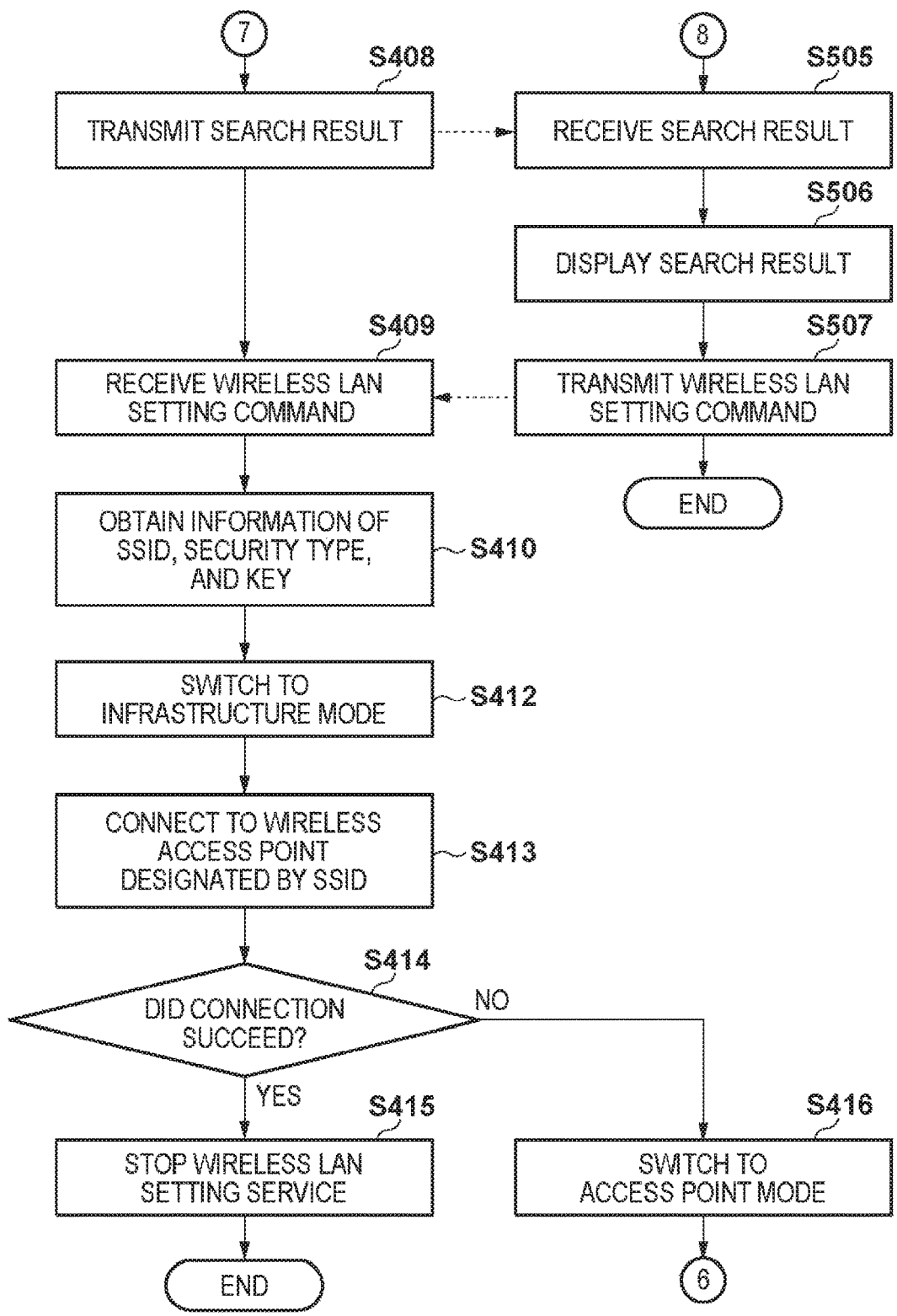

INFORMATION PROCESSING APPARATUS, METHOD OF CONTROLLING THE SAME, AND PROGRAM

TECHNICAL FIELD

The present invention relates to an information processing apparatus for which network setting is performed via a mobile terminal, a method of controlling the same, and a program.

BACKGROUND ART

Conventionally, there are known systems in which an information processing apparatus and mobile terminal, which are equipped with wireless interfaces, are connected to a network through a wireless access point, the information processing apparatus is operated from the mobile terminal, and information of the information processing apparatus is obtained. A technique for, in a case where an information processing apparatus is newly connected to a network, easily performing wireless LAN settings of the information processing apparatus has been proposed. For example, in Japanese Patent Laid-Open No. 2010-98765 and Japanese Patent Laid-Open No. 2013-153533, methods of setting wireless access point information in the information processing apparatus by using the mobile terminal have been proposed.

In Japanese Patent Laid-Open No. 2010-98765, a mobile terminal and an information processing apparatus are connected by a wired interface, and the mobile terminal transmits, to the information processing apparatus, network setting information (SSID or key information) for connecting to a wireless access point. The information processing apparatus can join the network by accessing the wireless access point accordance with the network setting information received from the mobile terminal. By the mobile terminal and the information processing apparatus communicating via a wireless access point after the information processing apparatus joins the network, a user can operate the mobile terminal to control the information processing apparatus and obtain information. Also, in Japanese Patent Laid-Open No. 2013-153533, wireless communication is established between an information processing apparatus and a mobile terminal, and network setting information for connecting to a wireless access point is transmitted from the mobile terminal to the information processing apparatus.

However, in the conventional technique described above, even after an operation from a terminal apparatus (external apparatus) such as a mobile terminal for causing the information processing apparatus to connect to a particular network, a state in which that kind of operation is possible continues. Accordingly, there is the possibility that by a third party operating the information processing apparatus from a particular terminal apparatus, a setting of the information processing apparatus will be rewritten illicitly. There is the possibility that as a result of this, the information processing apparatus will be connected to a network against the wishes of a user such as an administrator.

SUMMARY OF INVENTION

The present invention was conceived in view of the above described issues. The present invention provides a technique by which a user such as an administrator can appropriately manage activation and stoppage of a service that enables a setting for connecting an information processing apparatus to a particular network to be performed from an external apparatus.

According to one aspect of the present invention, here is provided an information processing apparatus comprising: a wireless interface configured to be operable in a first mode that causes the information processing apparatus to operate as a wireless access point and a second mode that causes the information processing apparatus to operate as a wireless terminal; activation means for activating, in a state in which the wireless interface is caused to operate in the first mode, a setting service that enables a setting for causing the information processing apparatus to connect to a network in the second mode to be performed from an external apparatus; receiving means for receiving, via the wireless interface, setting information for setting that uses the setting service, the setting information being transmitted from the external apparatus; and stopping means for stopping the setting service when the setting information is received by the receiving means.

According to another aspect of the present invention, there is provided a method of controlling an information processing apparatus comprising a wireless interface configured to be operable in a first mode that causes the information processing apparatus to operate as a wireless access point and a second mode that causes the information processing apparatus to operate as a wireless terminal, the method comprising: activating, in a state in which the wireless interface is caused to operate in the first mode, a setting service that enables a setting for causing the information processing apparatus to connect to a network in the second mode to be performed from an external apparatus; receiving via the wireless interface setting information for setting that uses the setting service, the setting information being transmitted from the external apparatus; and stopping the setting service when the received setting information.

By virtue of the present invention, a user such as an administrator is allowed to appropriately manage activation and stoppage of a service that enables performance from an external apparatus of setting for connecting an information processing apparatus to a particular network.

Further features of the present invention will become apparent from the following description of exemplary embodiments (with reference to the attached drawings).

BRIEF DESCRIPTION OF DRAWINGS

FIG. 1 is a schematic view illustrating an example of a system configuration.

FIG. 2 is a block diagram illustrating an example of a hardware configuration.

FIG. 3 is a block diagram illustrating an example of a software architecture.

FIG. 4A is a flowchart for describing a processing procedure according to a first embodiment.

FIG. 4B is a flowchart for describing a processing procedure according to a first embodiment.

FIG. 5A illustrates an example of an operation screen of a printer 101.

FIG. 5B illustrates an example of an operation screen of a printer 101.

FIG. 5C illustrates an example of an operation screen of a printer 101.

FIG. 5D illustrates an example of an operation screen of a printer 101.

FIG. 6A is a flowchart for describing a processing procedure according to a second embodiment.

FIG. 6B is a flowchart for describing a processing procedure according to a second embodiment, FIG. 7A is a flowchart for describing a processing procedure according to a third embodiment.

FIG. 7B is a flowchart for describing a processing procedure according to a third embodiment.

DESCRIPTION OF EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

<System Configuration>

Below, description will be given for a first embodiment of the present invention. First, with reference to FIG. 1, an example of a configuration of a system according to the present embodiment is described.

The system according to the present embodiment is configured to include a plurality of devices and a mobile terminal which are connected to a network. For example, in the system illustrated in FIG. 1, a PC 103, a digital multifunction device 104, a notebook PC 106, a printer 101 which is an information processing apparatus, and a mobile terminal 102 which is an external apparatus are included. In the present system, the plurality of devices are connected to a LAN 100 via a single wireless access point 105, and can perform two-way communication with the other devices connected to the LAN 100. Note that the system illustrated in FIG. 1 is only one example, and is not intended to limit the types or numbers of devices included in the system of the present invention. For example, the system may be configured to include other types of devices.

Here, the printer 101 of FIG. 1 is in a state in which it is not connected to the LAN 100 since network settings for connecting to the wireless access point 105 have not been performed. The mobile terminal 102 can connect to the LAN 100 via the wireless access point 105. The mobile terminal 102, via the wireless access point 105, can perform two-way communication with the other devices that are connected to the LAN 100, and can operate each device and perform status confirmation of each device from the mobile terminal 102. By virtue of the present embodiment, causing the printer 101 to connect to the LAN 100 via the wireless access point 105 is enabled by operating the mobile terminal 102. Accordingly, below, configuration and operation of the printer 101 and the mobile terminal 102 are primarily described.

<Hardware Configuration>

Next, with reference to FIG. 2, an example of a hardware configuration of the devices according to the present embodiment is described. First, a hardware configuration of the printer 101 is described. The printer 101 comprises a CPU 201, a ROM 202, a RAM 203, an HDD 204, an operation unit 205, a printer engine 206, and a wireless network I/F 207. Each component is connected via a bus 208, and can exchange data with each other.

The CPU 201 comprehensively controls operations of the printer 101 on the whole. The CPU 201 performs various control such as print control by reading a control program stored in the ROM 202 and executing the control program. The RAM 203 is a volatile memory that the CPU 201 uses, for example as a work area for executing various programs. The HDD 204 stores image data, various programs, or the like. The operation unit 205 is equipped with a display that operates as a touch panel and can be operated by a finger of the user. The printer engine 206 prints, on a sheet, image data transferred via the bus 208.

The wireless network interface (I/F) 207 is an NIC (Network Interface Card) that supports wireless networking and can connect to the wireless access point 105 and perform network communication. The wireless network I/F 207 has a function for connecting to a wireless LAN by a method compliant with an IEEE 802.11b/g/n standard, for example. Also, the wireless network I/F 207, upon instruction from the CPU 201, is capable of operating in a software access point mode (hereinafter referred to as "access point mode") and an infrastructure mode. In the access point mode (first mode), it is possible for the printer 101 itself to operate as a wireless access point, and communicate with other wireless LAN equipped devices (for example, the mobile terminal 102). In the infrastructure mode (second mode), the printer 101 can operate as a wireless terminal, and connect to a network by connecting to a wireless access point such as the wireless access point 105. In this way, the wireless network I/F 207 is an example of a wireless interface that can operate in an access point mode (a first mode) and an infrastructure mode (a second mode). Note that it is possible for the access point mode and the infrastructure mode to operate simultaneously rather than exclusively.

Next, a hardware configuration of the mobile terminal 102 is described. The mobile terminal 102 comprises a CPU 211, a RAM 212, a flash memory 213, an operation unit 214, a wireless network I/F 216, a speaker 217, a mic 218, a camera 219, and a GPS 220. Each component is connected via a bus 221, and can exchange data with each other.

The CPU 211 comprehensively controls operations of the mobile terminal on the whole. The RAM 212 is a volatile memory that the CPU 211 uses, for example as a work area for executing various programs. The flash memory 213 is a non-volatile memory that stores various programs or data. The operation unit 214 is equipped with a display that operates as a touch panel that can be operated by a finger of a user.

The wireless network I/F 216 is an NIC that supports wireless networking and can connect to the wireless access point 105 and perform network communication. The speaker 217 is a device that converts an electronic audio signal into sound that to be outputted. The mic 218 detects sound and converts it into an electronic signal. The camera 219 captures a still image or a moving image, and converts it into electronic data. The GPS 220 is a Global Positioning System receiver.

<Software Architecture>

Next, with reference to FIG. 3, a software architecture according to the present embodiment is described. The printer 101 and the mobile terminal 102 operate on a common framework that defines the communication protocol for communication via the wireless network I/F 207, and performs peer-to-peer communication based on a common framework specification. The common framework may be independently developed by a device manufacturer, or may be a framework that is established in a standard and independent of the maker. AllJoyn™ is an example of a standard that is employed.

Applications 312 to 314 which operate based on a common framework 311 are installed in the mobile terminal 102, and it is possible to operate each device through these applications. In the example of FIG. 3, the wireless LAN setting application 312, the device setting application 313, and the print application 314 are installed in the mobile terminal 102. While a plurality of applications are installed in this example, these applications may be configured as a single application.

The printer 101 is equipped with a common framework 301, and services such as a wireless LAN setting service 302, a print service 304 for performing printing, and a device setting service 303 for performing various settings of the printer 101 operate on the common framework. The printer 101 advertises its own services on the network via the common framework 301.

By this, it is possible for an application of the mobile terminal 102 to search for what kind of services the printer 101 has (discovery). For example, when the print application 314 of the mobile terminal 102 activates, the print application 314 starts a search for a print service on the network. The print application 314, upon detecting the print service 304 of the printer 101, can perform communication with the printer 101 via the common framework 311, and thereby the print service 304 of the printer 101 can be used from the mobile terminal 102. Note that processing of each of the services 302 to 304 and the common framework 301 of the printer 101 is executed by the CPU 201, and the processing of each of the applications 312 to 314 and the common framework 311 of the mobile terminal 102 is executed by the CPU 211. In the present embodiment, it is described that the common framework 301 operates via the wireless network I/F 207, but it may operate by another communication method such as NFC, Bluetooth™, or the like.

Next, the wireless LAN setting service 302 equipped in the printer 101 is described in more detail. The wireless LAN setting service 302 of the present embodiment is an example of a setting service that enables setting for connecting the printer 101 (an information processing apparatus) to the network in the infrastructure mode (second mode) to be performed from an external apparatus such as the mobile terminal 102. When the wireless LAN setting service 302 is used, setting of the wireless LAN of the printer 101 via the network is possible. By performing setting of the wireless LAN of the printer 101, it is possible to cause the printer 101 to connect to the wireless access point, and to cause the printer 101 to join the network (LAN) via the wireless access point. This kind of service is sometimes called an onboarding service.

The printer 101 accepts an access point search request command and a wireless LAN setting command from the mobile terminal 102 by using the wireless LAN setting service 302. The access point search request command is a command for requesting a search for a wireless access point in the vicinity of the printer 101, and obtaining a result thereof. The wireless LAN setting command is a command for performing wireless LAN settings of the printer 101. In the present embodiment is described a method of using the wireless LAN setting service 302 to cause the printer 101 to join the LAN 100 when it is in a state in which it is unconnected to the wireless access point 105.

<Processing Procedure>

Next, with reference to FIGS. 4A and 4B, description is given of a processing procedure according to the present embodiment that is executed by the printer 101 and the mobile terminal 102 in order to connect the printer 101 to the wireless access point 105. The processing described below is realized for the printer 101 by the CPU 201 reading a control program stored in the ROM 202 or the HDD 204 into the RAM 203, and executing it. Meanwhile, the processing is realized for the mobile terminal 102 by the CPU 211 reading a control program stored in the flash memory 213 into the RAM 212, and executing it.

Operation of the printer 101 is described. In step S401, the CPU 201 activates the wireless network I/F 207 in the infrastructure mode in conjunction with the power of the printer 101 being turned ON. In this way, the printer 101 of the present embodiment activates the wireless network I/F 207 not in the access point mode but in the infrastructure mode upon activation from a power OFF state. However, at this point in time, setting for connecting to the wireless access point 105 has not been performed, and so the printer 101 cannot perform communication with the wireless access point 105.

Next, in step S402, the CPU 201, when a predetermined user operation is accepted via the operation unit 205, displays a network setting screen 500 (FIG. 5A) on the operation unit 205. Here, the printer 101, prior to displaying the network setting screen 500, may perform user authentication by accepting input of a user name and a password on the operation unit 205. By this, it is possible to restrict so that the network setting screen 500 is only displayed to a user having a network setting authority.

FIGS. 5A to 5D illustrate examples of operation screen displayed on the operation unit 205 of the printer 101. As illustrated in FIGS. 5A to 5D, buttons for transitioning to various setting screens are displayed on the network setting screen 500. In the network setting screen 500 illustrated in FIG. 5A, it is possible to select an environment setting or a network setting, and when a network setting is selected, a TCP/IP setting 501 and a wireless LAN setting 502 are displayed as setting items. In the present embodiment, it is envisioned that the wireless LAN setting 502 is selected, and the display screen of the operation unit 205 transitions from the network setting screen 500 to a wireless LAN setting screen 510. On the wireless LAN setting screen 510, "manual setting" 511 and "use wireless LAN setting service" 512 are displayed selectably as wireless LAN settings.

The CPU 201 causes the display screen of the operation unit 205 to transition to a wireless LAN setting service screen 520 when "use wireless LAN setting service" is selected on the wireless LAN setting screen 510 displayed on the operation unit 205. As illustrated in FIG. 5C, in the wireless LAN setting service screen 520, a "start" button 521 and a "stop" button 522 are displayed as buttons for instructing starting and stopping of the wireless LAN setting service 302. In this way, the wireless LAN setting service screen 520 is an example of an operation screen for accepting user operations for instructing starting and stopping of the wireless LAN setting service 302. Note that on the wireless LAN setting service screen 520, the operation state (operating or stopped) of the wireless LAN setting service 302 is displayed as a status 524, and in FIG. 5C, it is displayed that the wireless LAN setting service 302 is "stopped".

The printer 101 of the present embodiment activates (starts) the wireless LAN setting service 302 in a state in which the wireless network I/F 207 is caused to operate in the access point mode (first mode). Accordingly, the CPU 201 switches the operation mode of the wireless network I/F 207 from the infrastructure mode to the access point mode before starting the wireless LAN setting service 302. A Service Set Identifier (SSID) and an encryption key (KEY) are necessary for switching to the access point mode. The SSID corresponds to an identifier for identifying the printer 101 which operates as a wireless access point in the access point mode. The encryption key corresponds to a password (security key) for accessing the wireless access point (the printer 101). In the printer 101 of the present embodiment, the SSID is fixed (predetermined) to "PrinterAP" and the encryption key is fixed to "123", as one example. The SSID and the encryption key are used as authentication information for an external apparatus such as the mobile terminal 102 to access the printer 101 in a case where the wireless network I/F 207 operates in the access point mode.

Note that the authentication information (SSID and KEY) used in the printer 101 may be information that a user sets in relation to the printer 101 in advance. Alternatively, the authentication information may be information newly (dynamically) generated every time the wireless network I/F 207 is switched from the infrastructure mode to the access point mode (every time operation in the access point mode starts). In such a case, the authentication information may be automatically generated randomly by the CPU 201. By making the SSID and the encryption key variable, only a user that knows them can connect to the printer 101, and it is possible to prevent a user that is not wished to connect from illicitly connecting to the printer 101.

As illustrated in FIG. 5C, an SSID, a security type, and an encryption key (KEY) are displayed on the wireless LAN setting service screen 520. Note that the security type illustrates a wireless communication encryption method and authentication method. On the wireless LAN setting service screen 520 illustrated in FIG. 5C, "PrinterAP", "WPA-PSK", and "123" are displayed respectively as the SSID, the security type, and the KEY. In this way, the CPU 201 displays, on the wireless LAN setting service screen 520, authentication information (SSID and KEY) for accessing the printer 101 in the access point mode. By this, the information of the SSID and the KEY is provided to the user of the mobile terminal 102. As a result, it becomes possible to access the printer 101 from an external apparatus such as the mobile terminal 102 using the authentication information. Also, a two-dimensional barcode image 523 including information of the SSID and the KEY is displayed on the wireless LAN setting service screen 520. This enables the mobile terminal 102 to obtain the authentication information of the printer 101 easily by using the camera 219.

Returning to the description of FIGS. 4A and 4B, the CPU 201, in step S403, determines whether or not a user operation instructing the start of the wireless LAN setting service 302 has been accepted on the operation unit 205 (that is, whether or not an instruction to start the wireless LAN setting service 302 has been accepted). The CPU 201 determines that an instruction to start the wireless LAN setting service 302 has been accepted in a case where the "start" button 521 is selected on the wireless LAN setting service screen 520, and advances the processing to step S404. In step S404, the CPU 201, after deciding the SSID and KEY used in the access point mode, switches the wireless network I/F 207 to the access point mode. By this, the CPU 201 causes the wireless network I/F 207 to operate in the access point mode. Note that in the present embodiment, the predetermined (fixed) SSID and KEY are decided as the SSID and KEY to use.

When switching to the access point mode completes, next, the CPU 201, in step S405, starts (activates) the wireless LAN setting service 302, and advertises the service on the network by using the common framework 301. By the printer 101 advertising the wireless LAN setting service 302, it becomes possible for the wireless LAN setting service 302 to be referenced as a service of the printer 101 from the mobile terminal 102.

When the CPU 201 starts the wireless LAN setting service 302, the CPU 201 changes the status 524 being displayed on the wireless LAN setting service screen 520 from "stopped" to "operating". As a result of this, a state in which a wireless LAN setting service screen 530 is displayed on the operation unit 205 is entered. Note that in the case where a "stop" button 522 is selected on the wireless LAN setting service screen 530, the CPU 201 stops the wireless LAN setting service 302, switches the wireless network I/F 207 to the infrastructure mode, and ends the processing.

Meanwhile, in the mobile terminal 102, in step S501, the CPU 211 activates the wireless LAN setting application 312 based on an instruction from the user. Additionally, the CPU 211, using the wireless network I/F 216, searches for a wireless access point positioned in the vicinity of the mobile terminal 102, and displays the search result on the operation unit 214. For example, the SSIDs of the wireless access points found in the search are displayed as the search results. By this, the CPU 211 allows the user to select the wireless access point to which the mobile terminal 102 is to perform the wireless LAN connection. Here, it is assumed that in order to cause the mobile terminal 102 to connect to the printer 101, "PrinterAP" which is the SSID of the printer 101 is selected by the user from the search results. When the SSID of the printer 101 is selected, the CPU 211 prompts the user to input the KEY ("123" here) corresponding to the SSID that was selected.

In step S502, when the CPU 211 accepts the SSID and KEY input from the user, the CPU 211 makes a peer-to-peer wireless LAN connection to the printer 101 by the wireless network I/F 216 by using the inputted SSID and KEY. Here, the information of the SSID and KEY are not inputted from the user using the operation unit 214, but rather are obtained by reading the two-dimensional barcode image 523 displayed on the operation unit 205 of the printer 101 by using the camera 219.

Next, in step S503, the CPU 211 searches for a service of the printer 101 and obtains information of a service (the wireless LAN setting service here) that the printer 101 provides. Here, services being advertised by the printer 101 are searched. When the CPU 211 confirms as the result of the service search that the printer 101 is providing the wireless LAN setting service 302, the CPU 211, in step S504, transmits the foregoing access point search request command to the printer 101.

In the printer 101, when the CPU 201, in step S406, receives the access point search request command from the mobile terminal 102 via the wireless network I/F 207, it performs processing according to the received command. Specifically, the CPU 201, in step S407, scans for beacon information transmitted from a wireless access point positioned in the vicinity of the printer 101 by using the wireless network I/F 207, and thereby searches for a wireless access point positioned in the vicinity. By scanning for beacon information, it is possible to obtain SSID and security type information of a wireless access point that can be connected to (that is, to discover a wireless access point that can be connected to). After that, the CPU 201, in step S408, transmits a list of wireless access points discovered in step S407 (for example, a list of SSIDs) to the mobile terminal 102 as the search results. In this way, the CPU 201 searches for a wireless access point positioned in the vicinity of the printer 101 in accordance with an instruction from the mobile terminal 102 made using the wireless LAN setting service 302, and transmits the search result to the mobile terminal 102.

In the mobile terminal 102, when the CPU 211, in step S505, receives the list of wireless access points (search results) from the printer 101, the CPU 211 displays the received list on the operation unit 214 in step S506. Here, the user operating the mobile terminal 102 selects the wireless access point to which the printer 101 is to be connected (for example, the wireless access point 105) from out of the list displayed on the operation unit 214, and inputs the KEY for connecting to the wireless access point. For example, in the case where the security type that is used is of a WPA format, the KEY is a code of a maximum of 63 one-byte alphanumeric characters. In the present embodiment, it is assumed that in step S506, the wireless access point 105 is selected.

When input from the user is accepted via the operation unit 214, the CPU 211, in step S507, transmits a wireless LAN setting command to the printer 101. The wireless LAN setting command includes information (network setting information) of, for example, the SSID, the KEY, and the security type of the wireless access point connection target (that is, the wireless access point 105) is included. Note that the network setting information is information for accessing the wireless access point 105, for example, and is different to authentication information for accessing the printer 101 described above (that is, information displayed on the wireless LAN setting service screen 520).

In the printer 101, in step S409, the CPU 201 receives from the mobile terminal 102 the wireless LAN setting command including network setting information including information for connecting to the wireless access point selected from the foregoing search results by the mobile terminal 102. The CPU 201 performs processing according to the received command when the wireless LAN setting command is received from the mobile terminal 102. Specifically, in step S410, the CPU 201 obtains network setting information included in the received command (specifically, information of the SSID, the KEY, and the security type).

When obtainment of the information succeeds in step S410, the CPU 201, in step S411, stops (ends) the wireless LAN setting service 302. The CPU 201, upon stoppage of the wireless LAN setting service 302, also stops advertising of the wireless LAN setting service. Even if the CPU 201 receives a command for the wireless LAN setting service 302 from the mobile terminal 102 thereafter, the CPU 201 does not perform processing corresponding to the command, and rather discards the received data. Specifically, in a case where the CPU 201 receives network setting information while the wireless LAN setting service 302 is operating, the printer 101 is caused to connect to the network in accordance with the setting information. Meanwhile, when the CPU 201 receives network setting information while the wireless LAN setting service 302 is stopped, the CPU 201 discards that setting information.

By this, it is possible to prevent a wireless LAN setting of the printer 101 being rewritten via a network by an external apparatus such as a mobile terminal other than the mobile terminal 102, and the printer 101 then being connected to a wireless access point that it is not wished to be connected to. Note that when the CPU 201 stops the wireless LAN setting service 302, the CPU 201 changes the status 524 being displayed on the wireless LAN setting service screen 530 from "operating" to "stopped". As a result of this, a state in which the wireless LAN setting service screen 520 is displayed on the operation unit 205 is entered.

After that, the CPU 201 performs control to switch the wireless network I/F 207 from the access point mode to the infrastructure mode, and to cause the printer 101 to connect to the network (the LAN 100) in accordance with the network setting information. Specifically, in step S412, the CPU 201 switches the wireless network I/F 207 from the access point mode to the infrastructure mode. After that, the CPU 201, in step S413, in accordance with the network setting information obtained in step S410, connects to the wireless access point (that is, the wireless access point 105) designated by the SSID included in the network setting information, and ends the processing.

When a connection with the wireless access point 105 succeeds, the printer 101 thereafter performs communication via the LAN 100 with the mobile terminal 102. The mobile terminal 102, by connecting to the wireless access point 105, is able to perform communication with the printer 101 via the wireless access point 105. By this, the user of the mobile terminal 102 is enabled to perform operations of the printer 101 such as setting or printing by using the applications equipped in the mobile terminal 102 (for example, the device setting application 313 or the print application 314).

As described above, the printer 101 of the present embodiment comprises the wireless network I/F 207 which is capable of operating in an access point mode in which the printer 101 is caused to operate as an access point, and an infrastructure mode in which the printer 101 is caused to operate as a wireless terminal. The CPU 201 of the printer 101 activates the wireless LAN setting service 302 in a state in which the wireless network I/F 207 is caused to operate in the access point mode. The wireless LAN setting service 302 is a service that enables setting for causing the printer 101 to connect to the network (the LAN 100 or the like) in the infrastructure mode, to be performed from an external apparatus (the mobile terminal 102 or the like). The CPU 201, via the wireless network I/F 207, receives network setting information transmitted from the external apparatus for setting using the wireless LAN setting service 302. This network setting information is transmitted as the wireless LAN setting command. Additionally, the CPU 201 stops the wireless LAN setting service 302 when the network setting information is received via the wireless network I/F 207.

In this way, by virtue of the present embodiment, it is possible to avoid, the wireless LAN setting service 302 continuing to operate in the printer 101 after receiving a wireless LAN setting command including network setting information. Thus, after wireless LAN setting is performed using the wireless LAN setting service 302, it is possible to prevent the wireless LAN setting of the printer 101 from being rewritten illicitly via the network by a third party. Accordingly, by virtue of the present embodiment, it is possible for a user such as an administrator to appropriately perform management of activating and stopping a service to enable setting for connecting the printer 101 (information processing apparatus) to a particular network to be performed from an external apparatus. Also, it becomes possible to cause the printer 101 to connect to a particular network by using an external apparatus (the terminal apparatus 102, for example) while also realizing appropriate management of such a service, and thereby it is possible to improve user convenience.

Second Embodiment

In the first embodiment, the printer 101 receives a wireless LAN setting command from the mobile terminal 102 (step S409), stops the wireless LAN setting service 302, and switches the wireless network I/F 207 from the access point mode to the infrastructure mode. However, when there is an error in the network setting information (the SSID, KEY, and security type information) included in the wireless LAN setting command that the printer 101 received, the wireless LAN setting cannot be made correctly, and it results in a failure to connect to the wireless access point. This can occur in cases where there is an error in the SSID that the user selected or the inputted KEY (encryption key) for transmission (step S507) of the wireless LAN setting command, for example.

In such a case, in the printer 101, a user operation that uses the operation screen illustrated in FIGS. 5A to 5D becomes necessary in order to start the wireless LAN setting service 302 again. Also, in a case where the SSID and the KEY are dynamically generated each time the printer 101 starts the access point mode, a user operation to input a new SSID and KEY for reconnection to the printer 101 becomes necessary in the mobile terminal 102. Accordingly, in the second embodiment, configuration is taken so that in a case of failing at wireless LAN setting using the wireless LAN setting service 302, the wireless LAN setting can be performed again without requiring excessive user operation. Below, for simplicity of description, parts that differ from the first embodiment are focused on in the description.

<Processing Procedure>

Next, with reference to FIGS. 6A and 6B, description is given of a processing procedure according to the present embodiment that is executed by the printer 101 and the mobile terminal 102 in order to connect the printer 101 to the wireless access point 105. The processing described below is realized for the printer 101 by the CPU 201 reading a control program stored in the ROM 202 or the HDD 204 into the RAM 203, and executing it. Meanwhile, the processing is realized for the mobile terminal 102 by the CPU 211 reading a control program stored in the flash memory 213 into the RAM 212, and executing it.

As illustrated in FIGS. 6A and 6B, the processing procedure (step S501 to step S507) in the mobile terminal 102 is the same as the processing procedure of the first embodiment illustrated in FIGS. 4A and 4B. Meanwhile, the processing procedure in the printer 101 differs to the processing procedure in the first embodiment in that step S404 of FIG. 4A is replaced with step S404A and step S404B and in that step S414 is added after step S413 of FIG. 4B. The processing for deciding the SSID and the KEY to use in the access point mode and the processing for switching the wireless network I/F 207 to the access point mode, in step S404 of FIG. 4A, are respectively performed in step S404A and step S404B. However, the processing performed in step S404A and step S404B is similar to the processing performed in step S404 of the first embodiment. Accordingly, the processing of step S401 to step S413 is similar to the first embodiment.

In the present embodiment, in step S413, the CPU 201 tries to connect to the wireless access point in accordance with the wireless LAN setting command received from the mobile terminal 102. After that, in step S414, the CPU 201 determines whether or not the connection to the wireless access point succeeded, and ends the processing in the case where the connection succeeded, and returns the processing to step S404B in the case where the connection failed. By this, specifically, in a case of failing to connect to the wireless access point due to an error in the network setting information included in the received wireless LAN setting command, the CPU 201 once again allows a wireless LAN setting that uses the wireless LAN setting service 302 to be performed. In such a case, as illustrated in FIGS. 6A and 6B, without making processing of step S402 to step S404A necessary, the CPU 201 once again performs the processing of step S404B and step S405.

Specifically, the CPU 201, without deciding the SSID and the KEY again, reuses the SSID and KEY that were decided when switching to the access point mode the previous time (in step S404A) to switch the wireless network I/F 207 to the access point mode in step S404B. In the present embodiment, the CPU 201 holds the SSID and KEY that were decided in step S404A in the RAM 203 or the HDD 204 without deleting them until the connection to the wireless access point succeeds, and thereby makes reuse thereof in step S404B possible. Accordingly, it becomes possible for the mobile terminal 102 to, in the case of failing at the wireless LAN setting used in the wireless LAN setting service 302, reconnect to the printer 101 without requiring a user operation for inputting a new SSID and KEY in the mobile terminal 102.

Also, the CPU 201 activates the wireless LAN setting service 302 in step S405 without requiring a user operation using the operation screens illustrated in FIGS. 5A to 5D for once again starting the wireless LAN setting service 302. The result of this is that the printer 101 transitions to a state in which a wireless LAN setting from the mobile terminal 102 is once again possible. After that, according to the processing of step S406 to step S413, the wireless LAN setting of the printer 101 from the mobile terminal 102 is once again performed by using the wireless LAN setting service 302. When the connection to the wireless access point succeeds in step S414, the CPU 201 deletes the SSID and the KEY held in the RAM 203 or the HDD 204, and ends the processing.

As described above, in the present embodiment, the CPU 201, when a connection in accordance with network setting information fails after stoppage of the wireless LAN setting service 302, switches the wireless network I/F 207 to the access point mode, and activates the setting service once again. Also, in the case where authentication information (the SSID and the KEY) are dynamically generated every time the access point mode is started, the CPU 201 uses the authentication information previously generated without change when switching the wireless network I/F 207 to the access point mode. By this, while realizing appropriate management of the wireless LAN setting service 302, even in the case where the wireless LAN setting using the setting service fails, it is possible to allow the wireless LAN setting to be performed once again from the mobile terminal 102 without requiring excessive user operation.

Third Embodiment

In the third embodiment, a variation of the second embodiment is described. In the second embodiment, irrespective of whether the connection to the wireless access point succeeds, the printer 101 stops the wireless LAN setting service 302 when the wireless LAN setting command is received from the mobile terminal 102. In such a case, every time connection to the wireless access point fails, activation and stoppage of the wireless LAN setting service 302 is repeated. Accordingly, a waiting period occurs for the user for the time required to activate and stop the wireless LAN setting service 302 every time a wireless LAN setting using the wireless LAN setting service 302 fails. Accordingly, in the third embodiment, configuration is taken so that such a user waiting period can be shortened. Below, for simplicity of description, parts that differ from the first and second embodiments are focused on in the description.

<Processing Procedure>

Next, with reference to FIGS. 7A and 7B, description is given of a processing procedure according to the present embodiment that is executed by the printer 101 and the mobile terminal 102 in order to connect the printer 101 to the wireless access point 105. The processing described below is realized for the printer 101 by the CPU 201 reading a control program stored in the ROM 202 or the HDD 204 into the RAM 203, and executing it. Meanwhile, the processing is realized for the mobile terminal 102 by the CPU 211 reading a control program stored in the flash memory 213 into the RAM 212, and executing it.

As illustrated in FIGS. 7A and 7B, the processing procedure (step S501 to step S507) in the mobile terminal 102 is the same as the processing procedure of the first and second embodiments. Meanwhile, in the printer 101, the CPU 201 performs processing similar to the first embodiment in step S401 to step S410, and performs processing of step S412 subsequent to step S410. After that, the CPU 201, after the processing of step S413, determines, in step S414, whether or not the connection to the wireless access point succeeded.

In the case where the connection succeeded, the CPU 201 advances the processing to step S415, stops the wireless LAN setting service 302, and ends the processing. Meanwhile, the CPU 201 advances the processing to step S416 in the case where the connection failed, switches the wireless network I/F 207 from the infrastructure mode to the access point mode, and returns the processing to step S406. Note that when performing switching to the access point mode, the CPU 201 reuses the SSID and KEY that were decided when switching to the access point mode the previous time similarly to in the second embodiment.

In this way, in the present embodiment, the CPU 201 tries to connect to the wireless access point in accordance with the wireless LAN setting command received from the mobile terminal 102, and stops the wireless LAN setting service 302 at a stage at which the connection succeeded. Specifically, the CPU 201 stops the wireless LAN setting service 302 when the network setting information is received from the mobile terminal 102 and the connection in accordance with the setting information succeeds. Accordingly, in contrast to the first and second embodiments, in the second embodiment, the wireless LAN setting service 302 is not stopped every time the wireless LAN setting command is received. Accordingly, by virtue of the present embodiment, it is possible to avoid a user waiting period occurring for the time required to activate and stop the wireless LAN setting service 302 every time the wireless LAN setting service 302 fails.

Note that it is possible to make various changes to the foregoing first through third embodiments. Processing for switching to the access point mode (step S404, step S404B, and step S416) and processing for switching to the infrastructure mode (step S412) described in the first through third embodiments, for example, is processing in a case where the wireless network I/F 207 operates in either the infrastructure mode or the access point mode (where the infrastructure mode and the access point mode are mutually exclusive). However, in the case where the wireless network I/F 207 can simultaneously operate in both the infrastructure mode and the access point mode, it is possible to omit such mode switching processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-164064, filed Aug. 24, 2016, which is hereby incorporated by reference herein in its entirety.

The invention claimed is:
1. An information processing apparatus comprising:
a wireless interface operable in a first mode that causes the information processing apparatus to operate as a wireless access point and a second mode that causes the information processing apparatus to operate as a wireless terminal;
at least one memory storing instructions; and
at least one processor that implements the instructions to execute a plurality of operations, including:
an activation operation that activates, in a state where the wireless interface is caused to operate in the first mode, a setting service that enables a setting for causing the information processing apparatus to connect to a network in the second mode to be performed from an external apparatus;
a reception operation that receives, via the wireless interface, setting information for a setting that uses the setting service transmitted from the external apparatus;
a switching operation that switches the wireless interface from the first mode to the second mode, and causes the information processing apparatus to connect to the network based on the received setting information;
a stopping operation that stops the setting service after the information processing apparatus has been connected to the network based on the received setting information; and
a discarding operation that discards the setting information in a case where the setting information is received by the receiving operation while the setting service is stopped.

2. The information processing apparatus according to claim 1, wherein:
the plurality of operations include an accepting operation that accepts a user operation instructing a start of the setting service, and
upon the user operation being accepted, the wireless interface is started to operate in the first mode and the setting service is activated.

3. The information processing apparatus according to claim 2, further comprising:
a display device,
wherein the plurality of operations include a displaying operation that controls the display device to display an operation screen that includes authentication information for accessing the information processing apparatus in the first mode to enable access from the external apparatus to the information processing apparatus using the authentication information.

4. The information processing apparatus according to claim 2, wherein:
the wireless interface is activated in the second mode upon activation of the information processing apparatus, and
upon the accepting operation accepting the user operation, the wireless interface is switched from the second mode to the first mode, and the setting service is activated.

5. The information processing apparatus according to claim 1, wherein:
the plurality of operations include a searching operation that, in accordance with an instruction from the external apparatus using the setting service, searches for a wireless access point positioned in a vicinity of the information processing apparatus, and transmits a search result to the external apparatus, and
the reception operation receives, from the external apparatus, the setting information, which includes information for connecting to a wireless access point that is selected from the search result by the external apparatus.

6. The information processing apparatus according to claim 1, wherein the activation operation, in a case where the connection in accordance with the setting information fails after the setting service is stopped, switches the wireless interface from the second mode to the first mode and again activates the setting service.

7. The information processing apparatus according to claim 6, wherein:
the plurality operations include a generation operation that newly generates authentication information for accessing the information processing apparatus in the first mode every time the wireless interface is switched from the second mode to the first mode, and
the generation operation, in a case where a connection in accordance with the setting information fails, uses the previously generated authentication information without change when the wireless interface is switched from the second mode to the first mode.

8. A method of controlling an information processing apparatus comprising a wireless interface operable in a first mode that causes the information processing apparatus to operate as a wireless access point and a second mode that causes the information processing apparatus to operate as a wireless terminal, the method comprising:
activating, in a state where the wireless interface is caused to operate in the first mode, a setting service that enables a setting for causing the information processing apparatus to connect to a network in the second mode to be performed from an external apparatus;
receiving, via the wireless interface, setting information for a setting that uses the setting service transmitted from the external apparatus;
switching the wireless interface from the first mode to the second mode, and causing the information processing apparatus to connect to the network based on the received setting information;
stopping the setting service after the information processing apparatus has been connected to the network based on the received setting information; and
discarding the setting information in a case where the setting information is received by the receiving while the setting service is stopped.

9. A non-transitory computer-readable storage medium storing a program executable by a computer to execute a method of controlling an information processing apparatus comprising a wireless interface operable in a first mode that causes the information processing apparatus to operate as a wireless access point and a second mode that causes the information processing apparatus to operate as a wireless terminal, the method comprising:
activating, in a state where the wireless interface is caused to operate in the first mode, a setting service that enables a setting for causing the information processing apparatus to connect to a network in the second mode to be performed from an external apparatus;
receiving, via the wireless interface, setting information for a setting that uses the setting service transmitted from the external apparatus;
switching the wireless interface from the first mode to the second mode, and causing the information processing apparatus to connect to the network based on the received setting information;
stopping the setting service after the information processing apparatus has been connected to the network based on the received setting information; and
discarding the setting information in a case where the setting information is received by the receiving while the setting service is stopped.

\* \* \* \* \*